Patented Sept. 3, 1946

2,407,002

UNITED STATES PATENT OFFICE 2,407,002

GLYCOL GLUCOSIDES AND DERIVATIVES THEREOF

William C. Griffin, Newport, Del., assignor to Atlas Powder Company, Wilmington, Del., a corporation of Delaware No Drawing. Application October 21, 1944, Serial No. 559,843

21 Claims. (Cl. 260—210)

The present invention relates to improvements in glycol glucosides and derivatives thereof.

An object of the invention is to provide a process for making glycol glucosides and compositions containing them.

Another object of the invention is to provide new compositions of glycol glucosides.

A further object of the invention is to provide a class of oxyethylene ethers of glycol glucosides and a process for making them.

A still further object of the invention is to provide a class of esters of oxyethylene ethers of glycol glucosides.

Other objects will become apparent in the course of the following description.

In my co-pending application, Ser. No. 494,973, filed July 16, 1943, for "Sugar derivatives" I have described the reaction of sugars with from 5 to 6 carbon atoms with certain glycols or glycol ethers in the presence of a strong mineral acid catalyst and under conditions preventing loss of volatile reactants and reaction products from the reaction mixture. Under the conditions described in my prior application, the reaction proceeds to a condition of equilibrium at which time there remains in the mixture a substantial amount of the sugar. In the case of the reaction of glucose and propylene or di-ethylene glycol, the reaction product at equilibrium contains reducing bodies equivalent to from 9 to 15% reducing sugar.

The products of the reaction of my said application are principally of value as plasticizers or conditioning agents for hydrophilic materials. Their relatively high sugar content constitutes a limitation for many uses, for example, they are not suitable for use in those industrial glue or gelatin compositions which must be recoverable and reusable. Their sugar content is also objectionable in the manufacture of certain chemical derivatives. While free sugar can be removed by suitable after-treatment it is costly and not satisfactory from a practical standpoint.

In accordance with the present invention, I have found a method by which the products of my earlier application can be treated to render them more stable chemically and to reduce their free sugar content to a value which is generally unobjectionable. I have also found a highly valuable series of chemical derivatives of these improved glucosides.

The improved glucoside compositions of this invention are prepared by first reacting the sugar and a glycol, or glycol ether, in the presence of a strong mineral acid catalyst under conditions preventing loss of volatile reactants and reaction products from the reaction mixture. Reaction is continued to substantial equilibrium. This first step is in accordance with my earlier filed application. The second step consists in continuing the reaction under conditions permitting, or promoting, the removal of volatile materials from the reaction mixture. The reaction of the second step is continued until a new equilibrium is substantially reached. The new equilibrium occurs at a point where the product contains 5% or less of sugar. That the reaction involves more than further glucosidation is indicated by the fact that the product has a much higher viscosity than the product of the first step, at equal water content. It appears probable that anhydridization and external condensation occur in addition to further glucosidation resulting in a complex polyhydroxylic composition which is water-soluble, hygroscopic, and capable of use either as such or in the preparation of a valuble series of chemical derivatives.

The sugars used in the invention are the 5 to 6 carbon atom sugars such as glucose, fructose, galactose, inverted sucrose, and xylose. Glucose is the preferred sugar. The glycols are the simple glycols with 2 to 3 carbon atoms or the dihydric inter-ethers thereof with not more than 6 carbon atoms. Suitable glycols are ethylene glycol, diethylene glycol, triethylene glycol, propylene glycols, dipropylene glycols, and hydroxy ethylene ethers of propylene glycols. Suitable strong mineral acid catalysts are sulfuric acid, hydrochloric acid, iodine (which forms iodine acids in the reaction) and aryl sulfonic acids. Sulfuric acid and iodine are the preferred catalysts.

The sugar and glycol or glycol ether are mixed in approximately mol for mol ratio, a small excess of the glycol or glycol ether being desirable. A small amount, for example 0.03 to 0.2% of the catalyst is added, suitably after the reactants have been heated to form a clear solution. The first step of the reaction is performed either under reflux or in a closed container to prevent loss of volatiles. The reactants are heated together preferably to a temperature of 100° to 140° C. during this first step. The duration of the reaction depends upon the time required to reach equilibrium. In the case of glucose and propylene or diethylene glycol about 9 to 15% reducing sugar remains at equilibrium.

The second step of the process consists in continuing the reaction under conditions permitting the escape of volatiles. This phase of the process can be conducted by heating the product of the first step in an open vessel freely permitting the escape of volatile materials. It is desirable, however, to conduct the heating under conditions actively promoting the escape of volatile materials. Thus the reactants can be held under vacuum during the heating and/or a gas can be jetted through the reactants during the heating. The temperature of the reaction mixture during this time should be sufficiently high to remove the volatile materials, but not high enough to cause decomposition. In general, temperatures of 100° to 140° C. are to be preferred. Heating is continued until equilibrium is substantially attained.

At the point of equilibrium the improved glucoside compositions of the invention contain not over 5% of sugar and generally less than 3% of sugar. They have viscosities of the order of 15,000 centipoises or higher at 85% concentration in water at 25° C. They may be used as such, as plasticizers or conditioning agents for glue, gelatine, cellulose products, tobacco, and other hydrophilic materials. Where the compositions are to be used as such, it is usually desirable to neutralize or remove the catalyst. Soluble ions can be removed by ion exchange methods. Color can be reduced when necessary, by bleaching or treatment with decolorizing carbon or a combination of the two. These glucoside compositions are particularly valuable as starting polyhydroxylic materials for the preparation of many useful chemical derivatives, such as esters, ethers and acetals that can be made at relatively low temperatures. The esters such as the acetates and propionates are of value as plasticizers, etc. The oxyalkylene ethers of these glucoside compositions, and the esters of the oxyalkylene ethers are particularly valuable derivatives.

The oxyalkylene ethers of the glucoside compositions can be prepared by reacting them with a substance capable of acting as an alkylene oxide, such as the alkylene oxides themselves, glycidol and its homologues, and functional equivalents particularly the chlorhydrins. The preferred oxyalkylene ethers are those prepared by reacting the glucoside compositions with ethylene oxide or 1,2 propylene oxide.

The reaction is preferably performed in an autoclave at an elevated temperature preferably not exceeding about 140° C. Reaction proceeds by the addition of alkylene oxide to hydroxyl groups producing oxyalkylene ethers of the glucoside composition. The alkylene oxide combines not only with the hydroxyl groups of the glucoside composition, but also with the hydroxyl groups of the oxyalkylene ethers producing polyglycol ether chains. This reaction is susceptible to wide variation as to the ratio of alkylene oxide to glucoside. The oxyalkylene ethers are water-soluble hygroscopic compositions. The viscosities of the ethers can be varied by varying the number of oxyalkylene groups introduced. The introduction of a small number of oxyethylene groups, for example 1 to 12 groups per mol of glucoside, results in a lowering of the viscosity of the glucoside. With increasing oxyethylene content the viscosities increase and ultimately, for example at 50 or more oxyethylene groups per mol of glucoside, water-soluble waxy products are obtained. The oxyalkylene ethers can be used as such for plasticizing or conditioning of hydrophilic materials like cellulose products, glues, tobacco, etc.

The most valuable characteristic of these oxyalkylene ethers, however, is the ability of the members of the series with 4 or more oxyalkylene groups per mol of glucoside to undergo conventional high temperature esterification reactions. Neither the unmodified sugar nor the unmodified glucosides will stand these conditions of reaction. The invention, therefore, provides a method for using sugars as polyhydric starting materials for the preparation of esters by the economical high temperature reaction using the free acids. Due to the stability of the oxyalkylene ethers the esters produced by hot esterification are of excellent quality as regards color and odor. A wide range of esterified products can be prepared by selection of different acids or mixtures of acids. Partial esters of hydrophobic acids useful as emulsifiers and dispersing agents can be prepared readily. Complete esters useful as plasticizers for hydrophobic materials such as synthetic resins, cellulose esters, etc., can also be prepared. A wide variety of acids can be used including acetic, propionic, butyric, and other lower fatty acids; the longer chain fatty acids such as capric, lauric, myristic, palmitic, stearic; unsaturated fatty acids particularly the acids obtainable from fatty oils like cottonseed, olive, soya bean, linseed, tung, etc.; aromatic acids such as benzoic, naphthenic, anacardic, etc.; polybasic acids such as maleic, phthalic, and sebacic.

The glucoside products of the invention are, as mentioned above, complex mixtures. In determining reaction ratios for the preparation of oxyalkylene or other derivatives it has been assumed for purpose of calculation that the average molecular weights of the complex products are the molecular weights of the simple glucosides, namely, the molecular weights of the sugar and the glycol or glycol ether minus the molecular weight of water. Thus, in the case of a reaction product of glucose and propylene glycol, which is the preferred composition of the invention, the molecular weight has been taken as 238 for purpose of calculation. The hot esterifiable oxyalkylene ethers of the glucose-propylene glycol product are those which are produced by reacting at least four molecular weights of the alkylene oxide with each 238 parts by weight of the glucoside product.

The following examples illustrate typical processes and compositions according to the invention.

Example I 180 parts by weight glucose (1 mol) and 83.6 parts by weight propylene glycol (1.1 mols) were placed together in a reaction vessel attached to an atmospheric reflux condenser, heated to the clearing temperature of about 120° C. at which time 0.05% iodine (based on total charge) was added. The temperature was then raised to 125° C. and heating was continued at atmospheric pressure for 30 minutes. Thereafter, the reaction vessel was connected to a vacuum line at a pressure of 50 mm. of mercury and heated for 50 minutes at 100° to 125° C. The product was diluted with water to an 85.4% solution and was found to have a viscosity of 25° C. of 27,000 centipoises. The product contained 1.3% reducing substance, expressed as glucose.

Example II 158.5 pounds propylene glycol were introduced into a reaction vessel operating under total reflux and heated to 80° C. Then 341.5 pounds glucose (anhydrous) were introduced and the mixture was heated gradually to 123° C. at which time 158 grams concentrated sulfuric acid were added as catalyst. The catalyst was added 1.5 hours after the introduction of the glucose. The reaction mixture was heated at about 123° C. for one half hour more under refluxing conditions, and then for four hours under reduced pressure of 27 inches of vacuum.

The product was a highly water-soluble, hygroscopic liquid containing 3.0% reducing substance, expressed as glucose.

Example III 158.5 pounds propylene glycol were introduced into a reaction vessel operating under total reflux and heated to 90° C. Then 341.5 pounds of glucose (anhydrous) were introduced and the mixture was heated gradually to 122° C. at which time 113 grams iodine were added as catalyst. The catalyst was added at 2.1 hours after the introduction of the glucose. The reaction mixture was heated at about 122° C. for 1.9 hours more under refluxing conditions and then for 6 hours under reduced pressure of 27 inches of vacuum.

The product was a highly viscous water-soluble hygroscopic liquid containing 1.2% reducing substance expressed as glucose.

Example IV

A polyoxyethylene ether of the product of Example III was prepared as follows:

776 pounds of the product of Example III were introduced into an autoclave together with 13 pounds sodium oleate which acts as catalyst. The mixture was heated to 235° F. at which time ethylene oxide was gradually introduced to maintain a pressure of about 40 pounds per square inch. The temperature was slowly raised to 250° F. during the run and a total of 862 pounds ethylene oxide was introduced gradually at approximately the rate at which it reacted. The temperature was maintained at 250° F. until the pressure in the autoclave dropped to normal.

The product of this reaction was a mixture of hydroxyethylene ethers of the product of Example III. The proportions were calculated to give an average of 6 oxyethylene groups per mol of propylene glycol glucoside, the product of Example III being assumed for purposes of calculation to have the average molecular weight of propylene glycol glucoside.

The product was a liquid with a lower viscosity than the product of Example III. It was water-soluble and hygroscopic. This product can be used directly as a conditioning agent or plasticizer for hydrophilic materials or as a solvent. A particularly valuable property of this material resides in its ability to withstand high temperature direct esterification reactions with organic acids. The product has an average of about 5 hydroxyl groups per mol. In addition to esterification, the product can also be reacted to form ethers, acetals, or the like. The number of reactive hydroxyl groups makes possible a very large series of derivatives of the type mentioned.

Example V

A series of stearic acid esters of the product of Example IV was prepared by direct reaction with double pressed stearic acid at a reaction temperature of from 198° to 200° C. The calculated monoester was prepared according to this method by reacting 1278 grams of the product of Example IV with 722 grams double pressed stearic acid. The reaction proceeded without difficulty and was substantially completed in three hours. During the last half hour of the reaction, decolorizing carbon was introduced in an amount equal to 2% of the total charge. After filtering out the carbon the product was given a bleach with hydrogen peroxide. A light colored waxy product was obtained which had a titer of 36.4° C. The product was dispersible in water and could be used as an emulsifier or as a self-emulsifying wax.

In a similar manner 940 grams of the product of Example IV and 1060 grams of double pressed stearic acid were reacted to give a calculated distearate. This reaction also proceeded without difficulty and the product after the same treatment was also a waxy solid with a titer of 37° C. This product is more lipophilic than the monoester but also possesses advantageous surface activity.

A calculated tetra-stearate of the product of Example IV was produced by reacting 613 grams of the product of Example IV with 1387 grams of double pressed stearic acid. The reaction progressed without difficulty and after the same purifying steps, a waxy solid product was obtained which had a titer of 38° C. This product can be used as a wax which possesses some hydrophilic properties.

Esters of different properties can be obtained by substituting other acids for all or part of the stearic acid, by changing the relative amounts of ethylene oxide to the glucoside product, or by substituting 1,2 propylene oxide or other alkylene oxide for ethylene oxide. By increasing the number of oxyethylene groups esters of increasing hydrophilic character can be obtained. The partial esters of the oxyalkylene ethers of the glucoside compositions can be made more hydrophilic and even water-soluble by introducing oxyethylene groups, preferably by reaction with ethylene oxide.

What is claimed is:

1. The process which comprises heating a sugar containing from 5 to 6 carbon atoms with a dihydric compound of the class consisting of glycols with 2 to 3 carbon atoms and the dihydric inter-ethers of said glycols with not more than 6 carbon atoms, in substantially equimolecular proportions, in the presence of a strong mineral acid catalyst, and under conditions in which volatile reactants and volatile reaction products are retained in the reaction mixture, until an equilibrium is substantially attained, and thereafter continuing the heating of the reaction mixture under conditions permitting the escape of volatile materials until the product contains not more than about 5% of residual sugar.

2. The process of claim 1 wherein the said catalyst is formed by the addition of iodine to the reaction mixture.

3. The process of claim 1 wherein the said catalyst is sulfuric acid.

4. The process of claim 1 wherein at least part of the last said heating of the reaction mixture is conducted under reduced pressure.

5. The process which comprises heating glucose with a dihydric compound of the class consisting of glycols with 2 to 3 carbon atoms and the dihydric inter-ethers of said glycols with not more than 6 carbon atoms, in substantially equimolecular proportions, in the presence of a strong mineral acid catalyst, and under conditions under which volatile reactants and volatile reaction products are retained in the reaction mixture, until an equilibrium is substantially attained, and thereafter continuing the heating of the reaction mixture under conditions permitting the escape of volatile materials until the product contains not more than about 5% reducing sugar.

6. The process which comprises heating glucose with propylene glycol in substantially equimolecular proportions, in the presence of a strong mineral acid catalyst, and under conditions in which volatile reactants and volatile reaction products are retained in the reaction mixture, until an equilibrium is substantially attained, and thereafter continuing the heating of the reaction mixture under conditions permitting the escape of volatile materials until the product contains not more than about 5% reducing sugar.

7. A process as in claim 6 wherein the said catalyst is formed by the addition of iodine to the reaction mixture.

8. A process as in claim 6 wherein the said catalyst is sulfuric acid.

9. The process which comprises heating glucose and propylene glycol in substantially equimolecular proportions, in the presence of iodine, to a temperature of about 100° to 140° C., and under conditions in which volatile reactants and volatile reaction products are retained in the reaction mixture, until an equilibrium is substantially attained, and thereafter heating the reaction mixture under reduced pressure to effect the removal of volatile materials, said heating under reduced pressure being continued until the product contains not more than about 5% reducing sugar.

10. The process which comprises heating glucose and propylene glycol in substantially equimolecular proportions, to a temperature of about 100° to 140° C., in the presence of sulfuric acid as a catalyst, and under conditions in which volatile reactants and volatile reaction products are retained in the reaction mixture, until an equilibrium is substantially attained, and thereafter heating the reaction mixture under reduced pressure to effect the removal of volatile materials, said heating under reduced pressure being continued until the product contains not more than about 5% reducing sugar.

11. A composition comprising the product produced by the process of claim 1.

12. A composition comprising the product produced by the process of claim 5.

13. A composition comprising the product produced by the process of claim 6.

14. A composition comprising the product of the reaction of an oxyalkylating agent on the product produced by the process of claim 1.

15. A composition comprising the product produced by the reaction of an oxyalkylating agent on the product produced by the process of claim 5.

16. A composition comprising the product produced by the reaction of an oxyalkylating agent on the product produced by the process of claim 6.

17. A composition comprising the product produced by the reaction of ethylene oxide on the product produced by the process of claim 6.

18. A composition comprising an organic acid ester of the product produced by the reaction of an oxyalkylating agent on the product produced by the process of claim 1.

19. A composition comprising an organic acid ester of the reaction product of an oxyalkylating agent on the product produced by the process of claim 5.

20. A composition comprising an organic acid ester of the product produced by the reaction of an alkylene oxide on the product produced by the process of claim 6 in the ratio of at least 4 molecular equivalents of said alkylene oxide for each 238 parts by weight of the product produced by the process of claim 6.

21. A composition comprising an organic acid ester of the product produced by the reaction of ethylene oxide on the product produced by the process of claim 6 in the ratio of at least 264 parts by weight of ethylene oxide to 238 parts by weight of the product of the process of claim 6.

WILLIAM C. GRIFFIN.